(12) United States Patent
Williams

(10) Patent No.: US 6,590,386 B1
(45) Date of Patent: Jul. 8, 2003

(54) ELECTRONICS SYSTEM FOR USE WITH PROJECTILE FIRING DEVICES

(75) Inventor: Benjamin M. Williams, Joplin, MO (US)

(73) Assignee: Brass Eagle, Inc., Bentonville, AR (US)

( * ) Notice: Subject to any disclaimer, the term of this patent is extended or adjusted under 35 U.S.C. 154(b) by 88 days.

(21) Appl. No.: 09/722,022

(22) Filed: Nov. 27, 2000

(51) Int. Cl.$^7$ ................................................. G01P 3/68
(52) U.S. Cl. ........................... 324/178; 124/71; 42/1.01
(58) Field of Search ................................. 324/178, 179, 324/180, 175, 226, 160; 124/56, 71; 42/1.01, 1.02, 106

(56) References Cited

U.S. PATENT DOCUMENTS

| | | | |
|---|---|---|---|
| 4,089,318 A | 5/1978 | Hesener | 124/16 |
| 4,129,829 A | 12/1978 | McLellan | 324/178 |
| 4,228,397 A | 10/1980 | Schmidt | 324/179 |
| 4,342,961 A | 8/1982 | Zimmermann et al. | 324/179 |
| 4,483,190 A | 11/1984 | Cornett | 73/167 |
| 4,486,710 A | 12/1984 | Schmidt | 324/179 |
| 4,524,323 A | 6/1985 | Schmidt | 324/179 |
| 4,574,238 A | 3/1986 | Weinlich | 324/178 |
| 4,677,376 A | 6/1987 | Ettel et al. | 324/179 |
| 4,845,690 A | 7/1989 | Oehler | 368/113 |
| 5,303,495 A | 4/1994 | Harthcock | 42/84 |
| 5,406,730 A | 4/1995 | Sayre | 42/1.02 |
| 5,566,486 A | 10/1996 | Brinkley | 42/1.02 |
| 5,736,720 A | 4/1998 | Bell et al. | 235/1 B |
| 5,918,304 A | 6/1999 | Gartz | 89/1.1 |

*Primary Examiner*—Walter E. Snow
(74) *Attorney, Agent, or Firm*—Foley & Lardner

(57) ABSTRACT

A universal electronics system has a body adapted to be removably mounted at the muzzle end of the barrel of almost any paintball marker. A pair of spaced detector units signal the time it takes for a paintball to pass through a portion of the body. A muzzle velocity calculating device converts the detector signals to a muzzle velocity, which is displayed on a display screen. The universal electronics system may further comprise a ball counter, a player counter, a clock, a chronometer that records elapsed time, a timer for recording time remaining in a game, and a thermometer. All of the data can be displayed on the display screen.

28 Claims, 5 Drawing Sheets

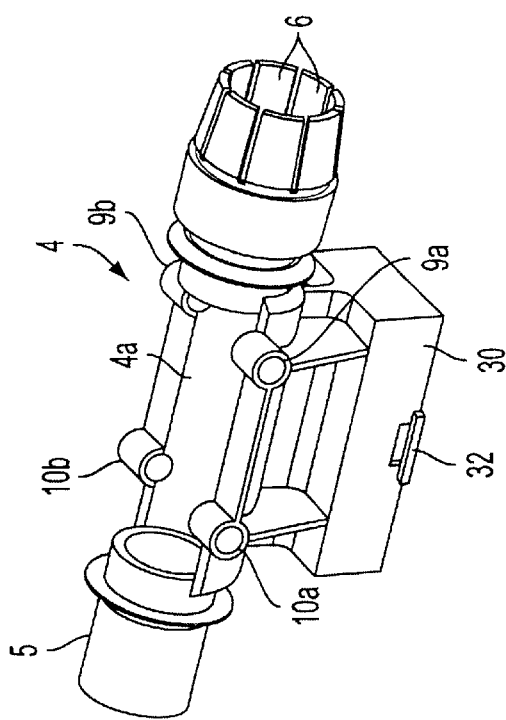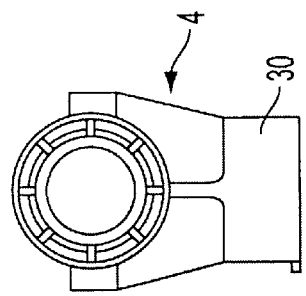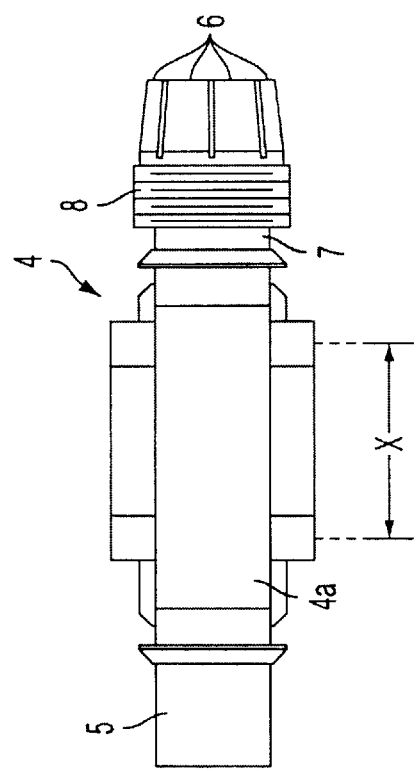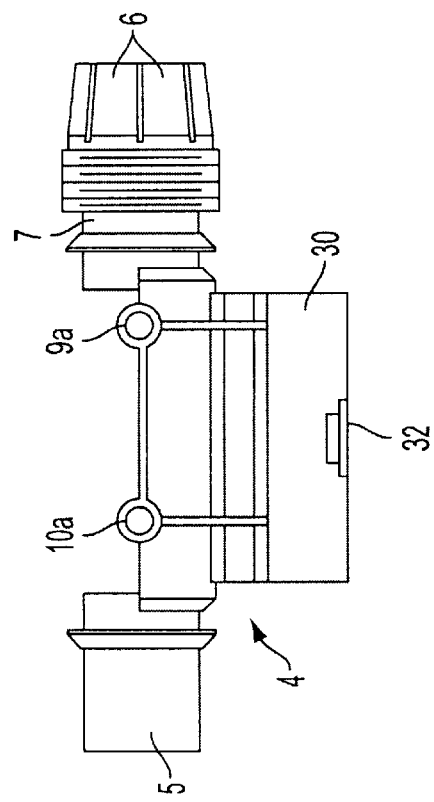

ELECTRONICS SYSTEM FOR USE WITH PROJECTILE FIRING DEVICES

FIELD OF THE INVENTION

The invention relates generally to an electronics system for measuring the velocity of projectiles, e.g., paintballs.

BACKGROUND OF THE INVENTION

The game of paintball has enjoyed great success in recent years. In one version of the game, each of two or more teams tries to capture the opposing team's flag. The players on the teams each carry a $CO_2$-powered marker that shoots paintballs—spherical capsules that contain a colored liquid—a considerable distance and at considerable velocity. When a player is hit with a paintball fired from a marker, the paintball ruptures and leaves a colored "splat" on the hit player who is then "out" and must leave the game. Protective clothing and gear are usually worn by the players.

In the interest of safety and fairness, game rules usually limit the permissible muzzle velocity of markers. The typical limit is 300 feet per second. If a player's marker is firing "hot," i.e., above the permissible muzzle velocity, at any time during the game, that player may be eliminated from the game.

To ensure that a marker is not firing hot, the muzzle velocity is typically adjusted before the start of the game and is calibrated using a bulky stand-alone chronograph, which displays the muzzle velocity of the marker when a paintball is shot through the chronograph's sensors. While such a practice usually ensures that a marker is not firing hot at the beginning of a game, it is possible for a marker to start firing hot during the course of a game. The marker is powered by a $CO_2$ canister. If, during the game, the canister's temperature rises for any reason (e.g., direct sunlight, ambient temperature increases, etc.), the pressure inside the canister increases, which causes the marker to shoot the paintball with greater force and a higher velocity. Thus, it is possible for a marker, which is properly firing before the game, to start firing paintballs at excessively high velocities during the game.

During a game, it is also useful for a player to keep track of the number of players remaining in the game, the time remaining in the game, the number of paintballs fired from the marker, elapsed time, real time, day, date, temperature, and perhaps other information.

SUMMARY OF THE INVENTION

It is, therefore, an object of the present invention to display to the player, during the game, the muzzle velocity of his marker, and thereby signal when the marker is firing hot.

It is a further object of the present invention to eliminate the need to use a stand-alone chronograph prior to every game to adjust the muzzle velocity of a player's marker.

It is a further object of the present invention to provide an electronics system that is easily attached to and detached from any marker.

It is a further object of the present invention to incorporate a ball counter, timer, chronometer, player counter, clock, and thermometer into the detachable electronics system.

According to one aspect of the invention, these and other objects are accomplished by providing an electronics system for use with a paintball marker, the electronics system comprising a body adapted to be removably mounted to the muzzle end of the barrel of the paintball marker, the body defining a tubular path for paintballs to travel therethrough. An optical detector assembly carried by the body is adapted to detect the time required for a paintball to move through a portion of the tubular path. A muzzle velocity calculating device operatively connected to the optical detector assembly calculates the muzzle velocity of the paintball.

The optical detector assembly preferably comprises a pair of optical detectors spaced along the tubular path by a predetermined distance, each of the optical detectors being adapted to detect movement of a paintball passing thereby. The optical detectors preferably are infrared detectors. A display screen preferably is supported on the body and is operatively connected to the muzzle velocity calculating device for displaying the muzzle velocity of the paintball.

According to another aspect of the invention, a chronograph for use with a projectile firing device comprises a body defining a tubular path for projectiles to travel therethrough, a projectile muzzle velocity detecting device carried by the body for detecting the velocity of projectiles passing through the body, and a clamp adapted to removably mount the body to the muzzle end of the barrel of the projectile firing device with the tubular path in the body in alignment with the barrel of the projectile firing device.

The chronograph may include an integral display screen that displays the muzzle velocity of the projectile as detected by the muzzle velocity detecting device. The clamping device may comprise a socket at one end of the body dimensioned to snugly receive the muzzle end of the barrel of the projectile firing device. The wall of the socket preferably is flexible, and the clamping device may have an internally tapered collet surrounding the socket, the collet being threaded to the body so that tightening of the collet on the body compresses the wall of the socket against the barrel of the projectile firing device.

According to yet another aspect of the invention, a self-contained electronics system for use with a projectile firing device comprises a body adapted to be removably mounted to the muzzle end of the barrel of the projectile firing device, the body defining a tubular path for projectiles to travel therethrough. A detector assembly carried by the body is adapted to detect the time required for a projectile to move through a portion of the tubular path. A muzzle velocity calculating device operatively connected to the detector assembly calculates the muzzle velocity of the projectile. A display screen supported on the body and operatively connected to the muzzle velocity calculating device displays the muzzle velocity of the projectile.

BRIEF DESCRIPTION OF THE DRAWING

The invention will be better understood from the following detailed description of a preferred embodiment of the invention, taken in conjunction with the accompanying drawing figures, in which:

FIGS. 1A–1D depict the universal electronics system according to the present invention, wherein:

FIG. 1A is a side elevational view thereof,

FIG. 1B is a rear elevational view thereof,

FIG. 1C is a sectional view taken along the line C—C of FIG. 1B, and

FIG. 1D is a perspective view thereof,

FIGS. 3A–3D depict the inner body of the universal electronics system, wherein:

FIG. 3A is a top plan view of the inner body,

FIG. 3B is a side elevational view of the inner body,

FIG. 3C is a perspective view of the inner body, and

FIG. 3D is a rear elevational view of the inner body;

DETAILED DESCRIPTION

Figure 1B:
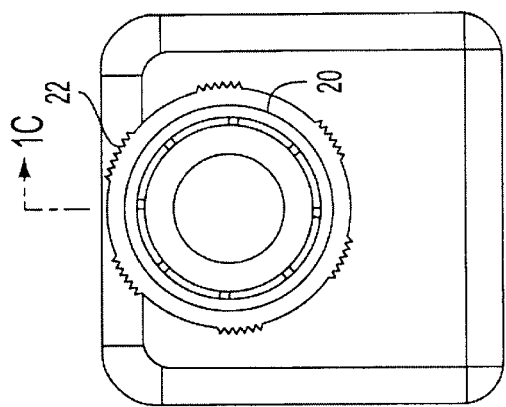
Figure 1D:
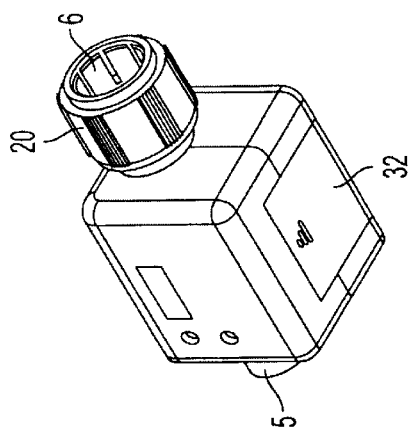
Figure 1A:
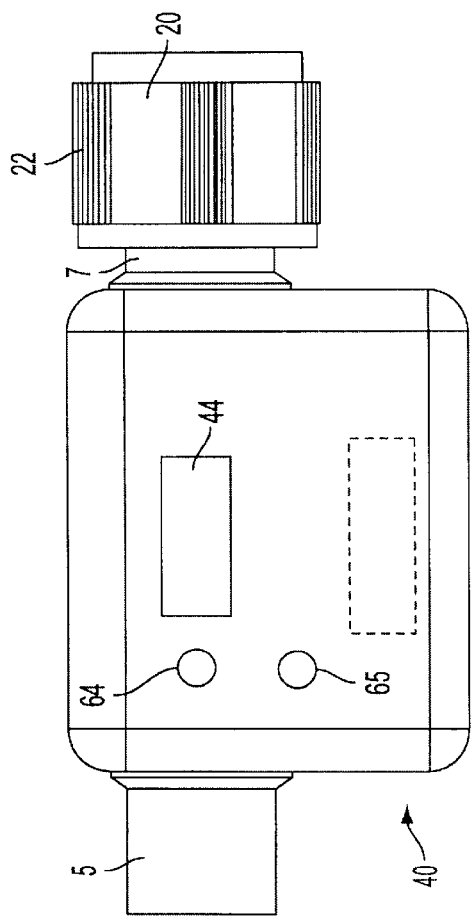
Figure 1C:
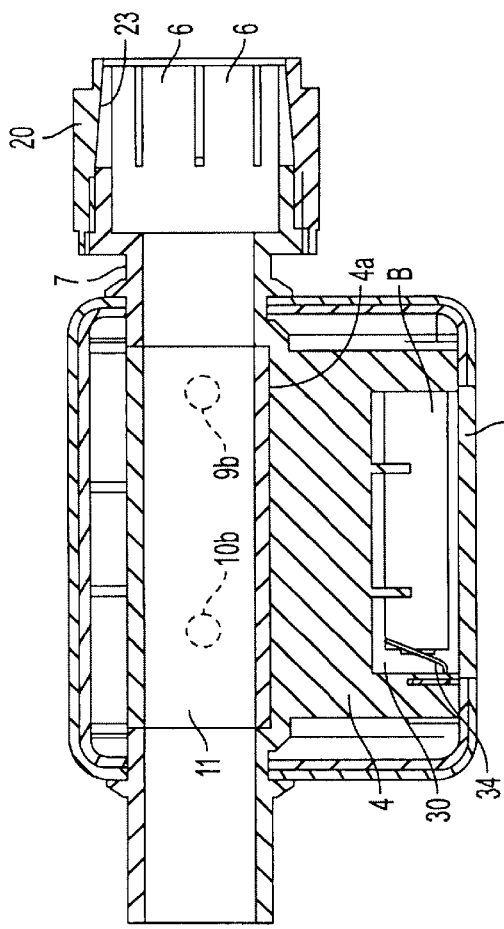
Figure 2:
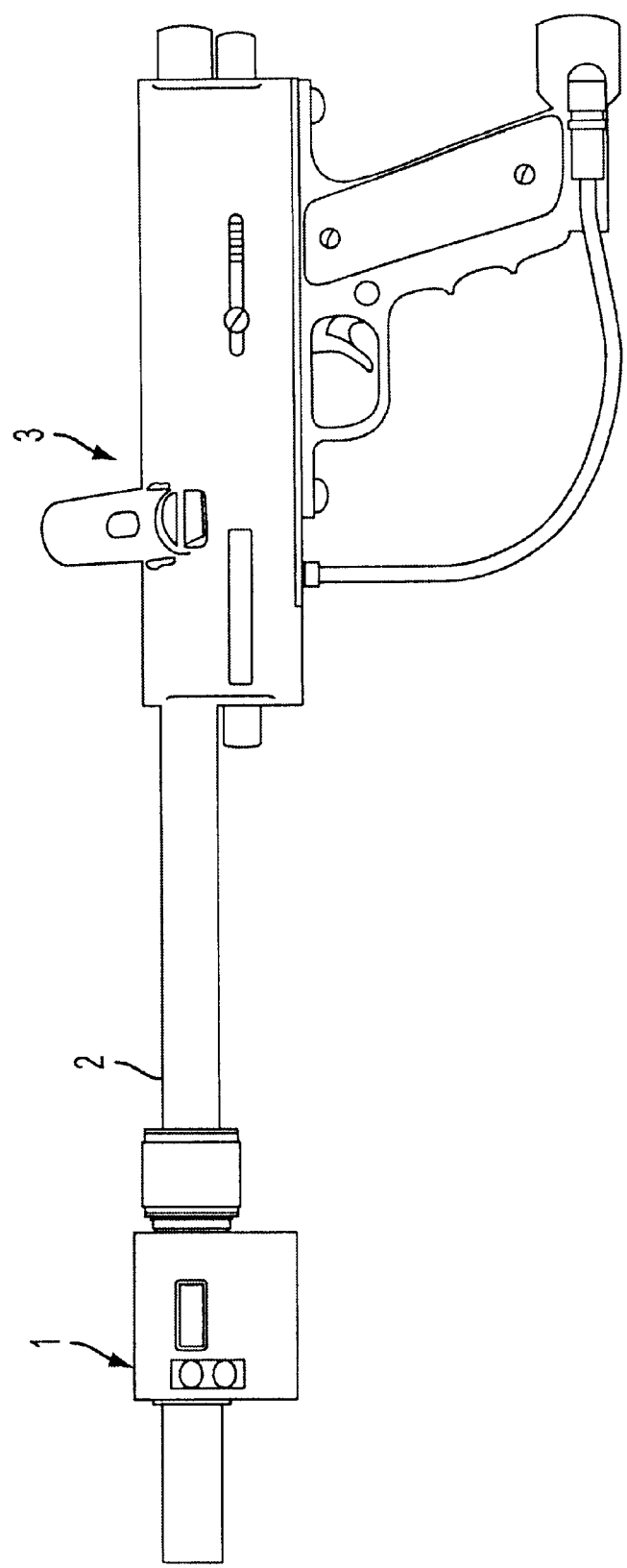
FIG. 2 is a side elevational view showing the universal electronics system mounted to a paintball marker.

FIG. 2 shows the universal electronics system 1 of the present invention mounted to the barrel 2 of a paintball marker 3. Referring to FIGS. 1A–1D and 3A–3D, a body 4, preferably made of nylon 6 or high-impact ABS, has a front tube 5 that forms a muzzle out of which paintballs are projected, and a back tube 7 adapted to be mounted to the muzzle end of the barrel of a paintball marker. An inner barrel 11 (shown in FIG. 1C but omitted from FIGS. 3A–3D), which preferably comprises a clear polycarbonate tube, is disposed in a trough 4a of body 4, and is coaxial with and butts up against both front tube 5 and back tube 7. When the system is mounted on paintball marker 3, barrel 2 of the marker is coaxial with back tube 7, inner barrel 11 and front tube 5 to allow free travel of paintballs out of barrel 3, through the electronics system 1 and out of the muzzle at the end of front tube 5.

Slightly tapered, circumferentially spaced flanges 6 project rearwardly from the back tube 7. Flanges 6 can flex somewhat in the radial direction, and form a socket that fits snugly over a standard diameter marker barrel 2. However, an adapter (not shown) may be used to accommodate odd-sized barrels.

Back tube 7 has external threads 8. A collet 20 has internal threads 21 that mesh with external threads 8 on back tube 7. Surface ribs 22 on collet 20 provide a non-slip surface to facilitate hand-tightening of the collet onto back tube 7. The inner surface 23 of collet 20 tapers inwardly toward the rear end. When collet 20 is screwed onto back tube 7, tapered inner surface 23 squeezes flanges 6 and presses them against the outside of marker barrel 2 so that they frictionally engage the barrel firmly to mount the universal electronics system 1 on the marker. By unscrewing collet 20, the pressure on flanges 6 is relieved and the electronics system 1 is easily detached from the marker.

Collet 20 and flanges 6 thus act to clamp the electronics system 1 removably and securely to, and in alignment with, the muzzle end of the barrel of a paintball marker, in a streamlined and effective manner. Other types of clamping collars and other clamping arrangements may be used as long as they maintain alignment of the paintball path, and removably secure the electronics system to the marker barrel so that it will not come loose during normal use.

A battery compartment 30 is formed in the base of body 4, closed by a removable cover 32. Battery compartment 30 houses two A-A batteries B that power the electronics system through suitable contacts (e.g., 34) and leads (not shown). The top, bottom, sides, front and back of body 4 are covered by a housing 40, preferably made of nylon 6 or high-impact ABS. The left side of housing 40 has a display window 44, a power switch 64 and a mode switch 65.

The motion of a paintball moving through inner barrel 11 is detected by a start detector unit and a stop detector unit. Each of these detector units has an emitter and a sensor. Referring to FIGS. 3A–3C, body 4 is formed with mounts in the form of apertured bosses 9a, 9b, 10a, 10b which support the detector units. Bosses 9a, 9b are diametrically opposed to one another near the upstream end of trough 4a, while bosses 10a, 10b are diametrically opposed to one another downstream of bosses 9a, 9b by a distance X (FIG. 3A), preferably of 1.6 in. The start emitter is housed in boss 9a; the start sensor is housed directly across from the start emitter, in boss 9b; the stop emitter is housed in boss 10a; and the stop sensor is housed directly across from the stop emitter, in boss 10b.

Figure 6:
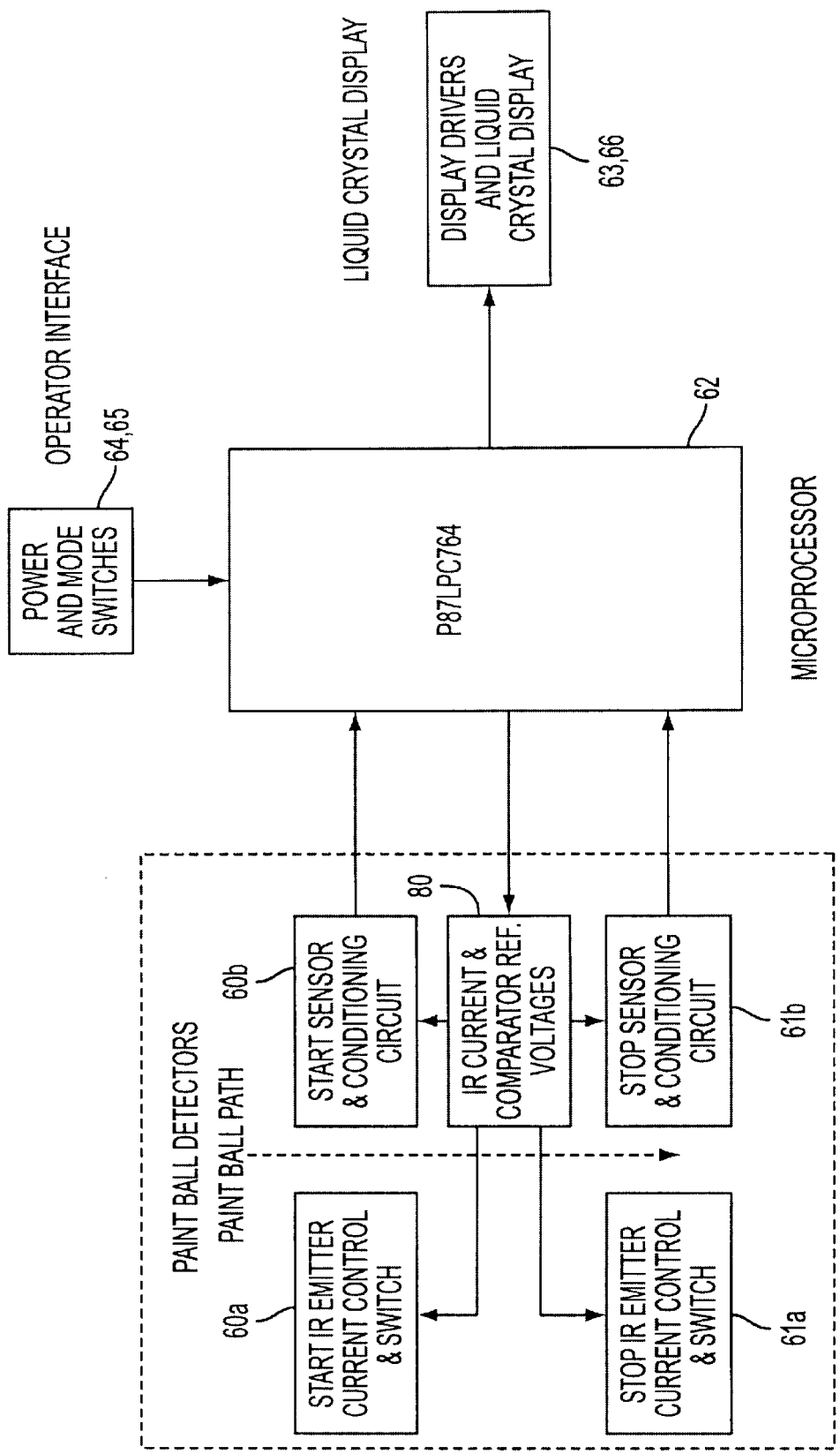
FIG. 6 is a circuit block diagram of the electronic components used in the universal electronics system.

FIG. 6 schematically illustrates the relative positions of the emitters, the sensors and the path of a paintball through inner barrel 11, and schematically illustrates the operation of the electronics system. Start emitter 60a (located in boss 9a) and stop emitter 61a (located in boss 10a) are infrared (IR) emitters, while start sensor 60b (located in boss 9b) and stop sensor 61b (located in boss 10b) are IR sensors. While IR sensors are preferred, other types of sensors could also be used to detect movement of paintballs through inner barrel 11. The IR beams emitted by the emitters 60a, 61a pass through clear inner barrel 11 directly to the respective sensors 60b, 61b. Start sensor 60b and stop sensor 61b are electronically connected to a microprocessor unit (MPU) 62. Also electronically connected to MPU 62 is an IR current & comparator reference voltages device 80, which interacts with the emitters 60a, 61a and sensors 60b, 61b. MPU 62 is also electronically connected to display drivers 66 and LCD display screen 63, and also to POWER switch 64 and MODE switch 65. As noted earlier, the system 1 is battery powered.

Emitters 60a, 61a provide nearly constant amplitude IR beams across the inner barrel 11 to their corresponding sensors 60b, 61b. Because the IR emitters are current controlled devices, a current control circuit is required to establish the relative constant current drive to each emitter 60a, 61a. It is important to use a current control arrangement because of the wide range of operating voltages in a battery powered device. A secondary function of this circuit is to remove power from the emitters to prevent battery drain during the OFF (sleep) mode of operation, which is discussed below.

The start and stop sensors 60b, 61b are normally biased ON electrically (i.e., they always "see" the IR beams from the IR emitters 60a, 61b) except when a paintball enters the emitter/sensor path. Paintball presence causes a sensor voltage decrease below the trip threshold of the sensor conditioning circuit comparators 80. As the paintball leaves the "beam" area of the sensor 60b, 61b, the voltage returns to normal level. This results in a logic state change to the MPU 62 and ultimately the beginning (or ending) of the timing process.

The actual timing process begins with the "trailing edge" of the sensor signal. In other words, the timing begins when the paintball leaves or exists the IR beam path. This is important for two reasons. First, the sensor environment is controlled because the paintball is at that time blocking any ambient light which may have been present in the sensor area (sunlight, etc.) which ultimately might have affected the sensor signal. Therefore, the effects of ambient light on accuracy are minimized. Second, the sensor output is in an "active" state of operation as it is being turned ON as opposed to the not entirely predictable type of signal produced as it turns off when the paintball enters its path (i.e. ambient light, reflection, ball color, etc. can all affect this state of change during turning OFF because of the uncontrolled optical environment at the time of the ball entry). To further enhance the quality of the sensor signal, the signal is fed into the comparator circuit 80 to "square up" (electronically clean up and establish predefined switching thresholds for the MPU 62) for more accurate timing. MPU 62 uses the time interval between when each of the signals from sensors 60b, 61b turns ON (i.e. detects the trailing edge of the paintball moving past the sensors 60b, 61b) to determine the velocity of the paintball according to the following formula:

rate=distance/time, wherein:

rate=speed of the paintball in feet/second distance=X (feet)

time=interval between when sensors 60b, 61b turn ON.

The operator interface now will be described with reference to FIGS. 1A and 6. As illustrated in FIG. 1(A), the interface comprises two pushbutton switches: POWER switch 64 and MODE switch 65. As illustrated in FIG. 6, switches 64, 65 are electronically connected to MPU 62. Both switches 64, 65 are of the momentary type and provide sequential (push/push) control for the operator. When POWER switch 64 is pushed once, the electronics system turns on. When POWER switch 64 is pushed again, the electronics system turns off.

Four operating modes are accessed with MODE switch 65: (1) "Ft/Sec" (paintball velocity), (2) "Hi-ft/sec" (maximum paintball velocity), (3) "Shots" (number of balls fired), and (4) "Shots Reset." "Ft/Sec" is the default display the first time battery power is applied to the electronics system. At all other times, display information is restored to its state prior to turning power off. "Ft/Sec" and "Shots" are latched functions, while the "Hi-Ft/Sec" and "Shots Reset" are momentary functions. The "Hi-Ft/Sec" is the "maximum" paintball velocity recorded since the last reset. It is always displayed alternately with "Hi-" value when changing from "Ft/Sec" to "Shots" display for as long as the MODE switch 65 is depressed. The data in "Ft/Sec" and "Shots" memory are always retained with power on or off but can be reset by holding the MODE switch for several seconds when advancing from "Shots" to "Ft/Sec". The display screen 63 (see FIG. 5) will register "Clr" to indicate that the "clear" mode reset timer is active. When cleared, the display will return to the normal "Shots" mode. "Clearing" the data also resets the "Hi-Ft/Sec" data to "0".

The MPU 62 (sometimes called an embedded controller) will now be described with reference to FIG. 6. Operating at a 4 MHz clock frequency under software control, MPU 62 provides the means for sensing, measuring, interfacing and displaying all appropriate aspects of the universal electronics system 1. When the system 1 is turned on, the MPU 62 provides power to all external circuitry—IR emitters 60a, 61a and sensors 60b, 61b, sensor comparators 80, display screen 63, and reference voltage divider "stack." The normal ON processor state is to monitor the POWER switch 64, MODE switch 65, start sensor 60b and stop sensor 61b. In addition, updated information is sent to the display 63 every 16 milliseconds.

As explained above, any time the processor is interrupted by a start sensor signal, a special timer interrupt routine is activated and takes precedence over all other functions. An internal timer is started when a paintball exits the start sensor area and is stopped when the paintball exits the stop sensor area. The calculated paintball velocity is stored in the MPU 62. The paintball "shots" memory is then incremented and the processor returns to normal activity until the next interruption. Because the display screen 63 is updated on 16 msec. intervals, the new information is displayed within 16 msec. of the exit of the paintball from the sensor area. A change in MODE switch 65 status will cause the prior mentioned changes to occur during normal operation.

When the POWER switch 64 is turned off, the system 1 enters a special "sleep" mode in which the processor essentially goes to sleep electronically in order to reduce battery current draw to a level small enough that it would require years to fully discharge the batteries used in the system 1. When in the "sleep" mode the processor removes power from all circuitry ("Vsw" is low or off) and consumes as little as 10 μamps of current in contrast to approximately 18 mamps when on. When in the sleep mode the only active function is the POWER switch 64 input. If the POWER switch is pressed, the input goes to a logic low state and "wakes" up the MPU 62 to resume normal operation. The circuit will remain awake as long as there is activity such as sensing a paintball or operation of the mode switch 65. A 30 minute software clock is automatically reset at the end of either activity. Should it time out, an automatic power off is initiated to preserve battery life should an operator forget to turn off the system after use.

Figure 5:
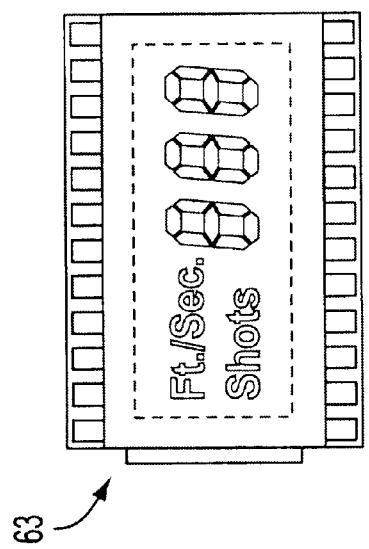
FIG. 5 is a front view of the display screen of the universal electronics system.
Figure 4B:
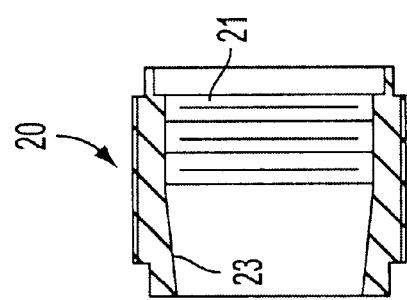
FIG. 4B is a sectional view of the collet taken along the line B—B in FIG. 4A.
Figure 4A:
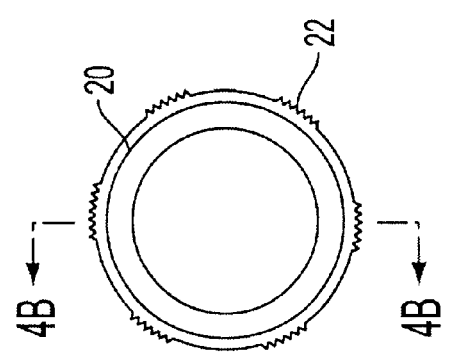
FIG. 4A is a rear elevational view of a collet for mounting the universal electronics system.

The display screen 63 now will be described with reference to FIG. 5. All information calculated by the MPU 62 is communicated to the operator via the LCD display screen 63. Display screen 63 has a numerical range of 0–999 and includes "Ft/Sec" and "Shots" enunciators. All display control is through serial communication from the MPU 62 to three serial in/parallel out shift registers, which independently control all 24 inputs to display screen 63. Data are shifted in via "SCLK" and "SDATA" lines from the MPU 62 every 16 msec. and "latched" via a momentary logic high on the "SLATCH" line. The operating frequency of the LCD is approximately 30 Hz. The system 1 may also be designed to interface with a remote display screen, such as might be incorporated in a protective goggle system.

One or more of the following features may be included in the universal electronics system of the invention: a player counter that records the number of players eliminated from a paintball game or remaining in a paintball game; a clock that records real time, day of the week, and date; a chronometer that records elapsed time; a timer for recording time remaining in a game; and a thermometer. Each of these inputs would be connected to display screen 63 such that the data can be displayed on the screen.

The above description and drawings are illustrative only, and modifications could be made by those skilled in the art without departing from the invention, the scope of which is to be limited only by the appended claims. It should be understood that while the invention has been described in detail as used in conjunction with paintball markers, it would work equally well with various other types of projectile firing devices.

What is claimed is:

1. An electronics system for use with a paintball marker, the electronics system comprising:

a body adapted to be removably mounted to the muzzle end of the barrel of a paintball marker, the body defining a tubular path for paintballs to travel therethrough;

an optical detector assembly carried by the body and adapted to detect the time required for a paintball to move through a portion of the tubular path; and a muzzle velocity calculating device operatively connected to the optical detector assembly for calculating the muzzle velocity of the paintball.

2. An electronics system according to claim 1, wherein the optical detector assembly comprises a pair of optical detectors spaced along the tubular path by a predetermined distance, each of the optical detectors being adapted to detect movement of a paintball passing thereby.

3. An electronics system according to claim 2, wherein the optical detectors are infrared detectors.

4. An electronics system according to claim 1, further comprising a display screen supported on the body and operatively connected to the muzzle velocity calculating device for displaying the muzzle velocity of the paintball.

5. An electronics system according to claim 4, wherein the muzzle velocity calculating device further comprises a ball counter that counts the number of paintballs fired to form a ball count, and wherein the display screen is adapted to display the ball count.

6. An electronics system according to claim 5, further comprising a player counter for recording the number of players eliminated from a paintball game or present in a paintball game.

7. An electronics system according to claim 5, further comprising a clock that records real time, day of the week, and date.

8. An electronics system according to claim 5, further comprising a chronometer that records elapsed time.

9. An electronics system according to claim 5, further comprising a timer for recording a countdown of time remaining in a paintball game.

10. An electronics system according to claim 5, further comprising a thermometer.

11. An electronics system according to claim 5, wherein the system is adapted to interface with remote displays.

12. An electronics system according to claim 2, wherein each optical detector comprises an optical emitter disposed on one side of the tubular path and an optical sensor disposed opposite the emitter on the opposite side of the tubular path, whereby a passing paintball interrupts the optical beam received by the optical sensor.

13. An electronics system according to claim 12, wherein the optical emitter is an infrared emitter, and the optical sensor is an infrared sensor.

14. An electronics system according to claim 13, wherein the muzzle velocity calculating device reacts to a signal from each optical detector just after a passing paintball has cleared the optical path between the optical emitter and the optical sensor.

15. An electronics system according to claim 12, wherein the muzzle velocity calculating device reacts to a signal from each optical detector just after a passing paintball has cleared the optical path between the optical emitter and the optical sensor.

16. A chronograph for use with a projectile firing device, the chronograph comprising:
a body defining a tubular path for projectiles from the projectile firing device to travel therethrough, the body adapted to be mounted to the muzzle end of the barrel of the projectile firing device with the tubular path in the body in alignment with the barrel of the projectile firing device;
a projectile muzzle velocity detecting device carried by the body for detecting the velocity of projectiles passing through the body; and
an integral display screen that displays the muzzle velocity of the projectile as detected by the muzzle velocity detecting device.

17. A chronograph according to claim 16, wherein a clamp removably mounts the chronograph to the muzzle end of the barrel of the projectile firing device, the clamp comprising a socket at one end of the body dimensioned to snugly receive the muzzle end of the barrel of the projectile firing device.

18. A chronograph according to claim 17, wherein the wall of the socket is flexible, and the clamp further comprises an internally tapered collet surrounding the socket, the collet being threaded to the body so that tightening of the collet on the body compresses the wall of the socket against the barrel of the projectile firing device.

19. A chronograph according to claim 18, wherein the wall of the socket is slit longitudinally to form a plurality of flexible longitudinal flanges.

20. A self-contained electronics system for use with a projectile firing device, the electronics system comprising:
a body adapted to be removably mounted to the muzzle end of the barrel of the projectile firing device, the body defining a tubular path for projectiles to travel therethrough;
a detector assembly carried by the body and adapted to detect the time required for a projectile to move through a portion of the tubular path;
a muzzle velocity calculating device operatively connected to the detector assembly for calculating the muzzle velocity of the projectile; and
a display screen supported on the body and operatively connected to the muzzle velocity calculating device for displaying the muzzle velocity of the projectile.

21. A self-contained electronics system according to claim 20, wherein the detector assembly comprises a pair of detectors spaced along the tubular path by a predetermined distance, each of the detectors being adapted to detect movement of a paintball passing thereby.

22. A self-contained electronics system according to claim 21, wherein each detector comprises a beam emitter disposed on one side of the tubular path and a sensor disposed opposite the emitter on the opposite side of the tubular path, whereby a passing paintball interrupts the beam received by the sensor.

23. A self-contained electronics system according to claim 22, wherein the muzzle velocity calculating device reacts to a signal from each detector just after a passing paintball has cleared the beam path between the emitter and the sensor.

24. A self-contained electronics system according to claim 23, wherein the emitter is an infrared emitter, and the sensor is an infrared sensor.

25. A self-contained electronics system according to claim 21, further comprising a clamp adapted to removably mount the body to the muzzle end of the barrel of the projectile firing device with the tubular path in the body in alignment with the barrel of the projectile firing device.

26. A self-contained electronics system according to claim 25, wherein the clamp comprises a socket at one end of the body dimensioned to snugly receive the muzzle end of the barrel of the projectile firing device.

27. A self-contained electronics system according to claim 26, wherein the wall of the socket is flexible, and the clamp further comprises an internally tapered collet surrounding the socket, the collet being threaded to the body so that tightening of the collet on the body compresses the wall of the socket against the barrel of the projectile firing device.

28. A self-contained electronics system according to claim 27, wherein the wall of the socket is slit longitudinally to form a plurality of flexible longitudinal flanges.

* * * * *